United States Patent [19]
Furukawa et al.

[11] Patent Number: 4,975,488
[45] Date of Patent: Dec. 4, 1990

[54] CURABLE COMPOSITION AT ROOM TEMPERATURE

[75] Inventors: Hisao Furukawa, Kobe; Jo Kawamura, Akashi; Naotami Ando, Hyogo; Hideyuki Ohnari, Takasago, all of Japan

[73] Assignee: Kanegafuchi Kagaku Kogyo Kabushiki Kaisha, Osaka, Japan

[21] Appl. No.: 246,110

[22] Filed: Sep. 19, 1988

[30] Foreign Application Priority Data

Sep. 18, 1987 [JP] Japan ............................. 62-233791

[51] Int. Cl.$^5$ .............................................. C08F 8/00
[52] U.S. Cl. ....................................... 525/100; 525/101; 525/102; 525/104; 528/23; 528/25; 528/901
[58] Field of Search ............... 525/100, 102, 104, 106; 528/23, 901, 101, 25

[56] References Cited

U.S. PATENT DOCUMENTS

| | | | |
|---|---|---|---|
| 3,408,420 | 10/1968 | Wiggill | 525/102 |
| 4,191,714 | 3/1980 | Yonezawa | 525/102 |
| 4,345,053 | 8/1982 | Rizk et al. | 525/440 |
| 4,507,437 | 3/1985 | Kato et al. | 525/106 |
| 4,609,587 | 9/1986 | Giordano et al. | |
| 4,657,978 | 4/1987 | Wakabayashi | 525/100 |
| 4,689,085 | 8/1987 | Plueddemann | 106/287.14 |
| 4,756,931 | 7/1988 | Giordano et al. | |
| 4,788,254 | 11/1988 | Kawakubo et al. | 525/100 |
| 4,837,275 | 6/1989 | Kawakubo et al. | 525/100 |

FOREIGN PATENT DOCUMENTS

| | | |
|---|---|---|
| 0054923 | 6/1982 | European Pat. Off. |
| 54-36395 | 3/1979 | Japan |
| 57-36109 | 2/1982 | Japan |
| 57-55954 | 3/1982 | Japan |
| 58-19367 | 4/1983 | Japan |
| 58-157810 | 9/1983 | Japan |

*Primary Examiner*—Melvyn I. Marquis
*Assistant Examiner*—R. Dean, Jr.
*Attorney, Agent, or Firm*—Armstrong, Nikaido, Marmelstein, Kubovcik & Murray

[57] ABSTRACT

A curable composition at room temperature comprising (A) 100 parts by weight of a hydrolyzable silyl group-containing vinyl polymer, (B) 0.1 to 100 parts by weight of a specific silane compound and (C) 0 to 20 parts by weight of a curing catalyst, the silane compound (B) being a silane compound selected from compound: $R_n^1 Si - R^2 - SiR_n^1$, the compound: $R_n^1 Si - R^3$,
$\quad\quad\quad |\quad\quad\quad\quad |\quad\quad\quad\quad\quad\quad\quad\quad\quad\quad |$
$\quad\quad X_{3-n}\quad\quad X_{3-n}\quad\quad\quad\quad\quad\quad\quad X_{3-n}$ the compound: $R_n^1 Si + CH_2 \overline{)_3} O - R^2 - O + CH_2 \overline{)_3} SiR_n^1$,
$\quad\quad\quad\quad\quad |\quad\quad\quad\quad\quad\quad\quad\quad\quad\quad\quad\quad\quad\quad\quad |$
$\quad\quad\quad\quad X_{3-n}\quad\quad\quad\quad\quad\quad\quad\quad\quad\quad X_{3-n}$ the compound: $R_n^1 Si + CH_2 \overline{)_3} O - R^3$,
$\quad\quad\quad\quad\quad |$
$\quad\quad\quad\quad X_{3-n}$ $\quad\quad\quad\quad\quad\quad\quad\quad\quad\quad\quad HO\quad\quad\quad\quad OH$
$\quad\quad\quad\quad\quad\quad\quad\quad\quad\quad\quad\quad |\ ||\quad\quad\quad\ \ ||\ |$
the compound: $R_n^1 Si + CH_2 \overline{)_3} NC - O - R^2 - OCN + CH_2 \overline{)_3} SiR_n^1$,
$\quad\quad\quad\quad\quad |\quad\quad\quad\quad\quad\quad\quad\quad\quad\quad\quad\quad\quad\quad\quad\quad\quad |$
$\quad\quad\quad X_{3-n}\quad\quad\quad\quad\quad\quad\quad\quad\quad\quad\quad\quad\quad X_{3-n}$ $\quad\quad\quad\quad\quad\quad\quad\quad\quad\quad\quad\quad\quad\quad\quad\quad\quad\quad\quad H\quad O$
$\quad\quad\quad\quad\quad\quad\quad\quad\quad\quad\quad\quad\quad\quad\quad\quad\quad\quad\quad |\ \ \ ||$
and the compound: $R_n^1 Si + CH_2 \overline{)_3} N - C - O - R^3$.
$\quad\quad\quad\quad\quad\quad\quad\quad\quad\quad\quad |$
$\quad\quad\quad\quad\quad\quad\quad\quad X_{3-n}$ The composition is excellent in not only adhesion to melamine alkyd or melamine acrylic resin coatings but also hardness, solvent resistance and staining resistance.

9 Claims, No Drawings

CURABLE COMPOSITION AT ROOM TEMPERATURE

BACKGROUND OF THE INVENTION

The present invention relates to a curable composition at room temperature having improved adhesion. More particularly, the present invention relates to a curable composition at room temperature having improved adhesion to films of coatings ordinary used such as melamine alkyd resin coatings and melamineacrylic resin coatings, which is suitable for use as an automotive refinishing paint.

It has been known that a hydrolyzable silyl group-containing vinyl resin is curable at room temperature due to moisture in atmosphere to form a fine network structure, thus resulting in formation of coatings having excellent gloss, weatherability, discoloration resistance, solvent resistance, hardness and adhesion to inorganic substrates.

Therefore, it is possible to use the hydrolyzable silyl group-containing vinyl resin in various purpose such as paints, adhesives, coating materials, sealants or binders, by utilizing such excellent properties of the resin.

However, the hydrolyzable silyl group-containing vinyl resin is unsatisfactory in adhesion to organic substrates. An automotive refinishing paint is required to have excellent adhesion to various coating films conventionally used, particularly to melamine-acrylic resin coatings or melamine alkyd resin coatings.

In order to improve the adhesion of the hydrolyzable silyl group-containing vinyl resin to the melamine alkyd resin coatings or melamine-acrylic resin coatings, there is known a method in which an amine silane coupling agent or a modified amine silane coupling agent is admixed with the resin. However, there are problems in the method such that the hydrolyzable silyl group-containing vinyl resin declines in storage stability and discoloring is easily caused.

An object of the present invention is to provide a composition curable at room temperature having excellent adhesion to the melamine alkyd resin coatings or melamine-acrylic resin coatings.

This and other objects of the present invention will become apparent from the description hereinafter.

SUMMARY OF THE INVENTION

It has now been found that when a specific silane compound is admixed with the hydrolyzable silyl group-containing vinyl resin, the adhesion to the melamine alkyd resin coatings and melamine-acrylic resin coatings can be remarkably improved.

That is, in accordance with the present invention, there is provided a curable composition at room temperature comprising
(A) 100 parts by weight of a vinyl polymer having on the polymer chain end or the side chain thereof at least one silicon atom to which a hydrolyzable group is linked, per one molecule, the main chain of the vinyl polymer consisting essentially of a polymer of a vinyl compound,
(B) 0.1 to 100 parts by weight of a silane compound and
(C) 0 to 20 parts by weight of a curing catalyst; the silane compound (B) being a silane compound selected from the group consisting of a compound having the formula (B-1):

wherein each $R^1$ is independently a monovalent hydrocarbon group having 1 to 10 carbon atoms selected from an alkyl group, an aralkyl group and an aryl group, and when more than one $R^1$ are present, the groups $R^1$ are the same or different; $R^2$ is a bivalent hydrocarbon group having 8 to 200 carbon atoms selected from an alkylene group, an aralkylene group and an arylene group; each X is independently a halogen atom, a hydroxyl group, an alkoxyl group, an acyloxy group, an aminoxy group, a phenoxy group, a thioalkoxyl group, an amino group, a ketoxymate group or an alkenyloxy group, and when more than one X are present, the groups X are the same or different; and n is 0, 1 or 2,
a compound having the formula (B-2):

wherein $R^3$ is a monovalent hydrocarbon group having 8 to 200 carbon atoms selected from an alkyl group, an aralkyl group and an aryl group; and $R^1$, X and n are as defined above,
a compound having the formula (B-3):

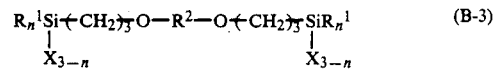

wherein $R^1$, $R^2$, X and n are as defined above,
a compound having the formula (B-4):

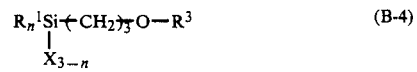

wherein $R^1$, $R^3$, X and n are as defined above,
a compound having the formula (B-5):

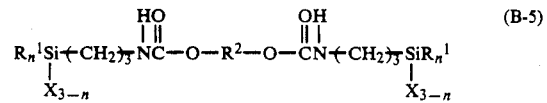

wherein $R^1$, $R^2$, X and n are as defined above, and
a compound having the formula (B-6):

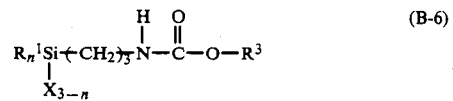

wherein $R^1$, $R^3$, X and n are as defined above.

The curable composition of the present invention is excellent not only in adhesion to the melamine alkyd or melamine acrylic resin coating but also in hardness, solvent resistance, staining resistance, and the like.

DETAILED DESCRIPTION

The polymer of which the main chain consists essentially of a polymer of a vinyl compound and which has on the polymer chain end or the side chain thereof at least one silicon atom combined with a hydrolyzable group per one polymer molecule (hereinafter referred to as "hydrolyzable silyl group-containing vinyl polymer") is used in the present invention as a component (A). The hydrolyzable silyl group-containing vinyl polymer (A) can be prepared by copolymerizing a vinyl monomer with a hydrolyzable silyl group-containing monomer. The hydrolyzable silyl group-containing vinyl polymer (A) may partially contain urethane bonds or siloxane bonds in its main chain or side chain.

The vinyl monomer used in the present invention is not particularly limited. Examples of the vinyl monomer are, for instance, an unsaturated carboxylic ester such as methyl acrylate, methyl methacrylate, ethyl acrylate, ethyl methacrylate, butyl acrylate, butyl methacrylate, 2-ethylhexyl acrylate, 2-ethylhexyl methacrylate, stearyl acrylate, stearyl methacrylate, benzyl acrylate, benzyl methacrylate, cyclohexyl acrylate, cyclohexyl methacrylate, trifluoroethyl acrylate, trifluoroethyl methacrylate, pentafluoropropyl acrylate, pentafluoropropyl methacrylate, or a diester or half ester of a polycarboxylic acid such as maleic acid, fumaric acid or itaconic acid with an alcohol with 1 to 20 carbon atoms having a linear or branched chain; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallyl phthalate; a nitrile group-containing vinyl compound such as acrylonitrile or methacrylonitrile; an epoxy group-containing vinyl compound such as glycidyl acrylate or glycidyl methacrylate; an amino group-containing vinyl compound such as dimethylaminoethyl acrylate, dimethylaminoethyl methacrylate, diethylaminoethyl acrylate, diethylaminoethyl methacrylate, vinylpyridine, aminoethyl vinyl ether; an amide group-containing vinyl compound such as acrylamide, methacrylamide, itaconic acid diamide, α-ethyl acrylamide, α-ethyl methacrylamide, crotonamide, maleic acid diamide, fumaric acid diamide, N-vinylpyrrolidone, N-butoxymethyl acrylamide, N-butoxymethyl methacrylamide, N,N-dimethyl acrylamide, N-methyl acrylamide or acryloyl morpholine; a hydroxyl group-containing vinyl compound such as 2-hydroxyethyl acrylate, 2-hydroxyethyl methacrylate, 2-hydroxypropyl acrylate, 2-hydroxypropyl methacrylate, 2-hydroxyethyl vinyl ether, N-methylolacrylamide, N-methylol methacrylamide, "Aronix 5700" (commercially available from Toagosei Chemical Industry Co., Ltd.), "Placcel FA-1" [polycaprolactone containing acryloyl group at the side end and which has a number average molecular weight (hereinafter referred to as "M̄n") of 230] (commercially available from Daicel Chemical Industries, Ltd.), "Placcel FA-4" (polycaprolactone containing acryloyl group at the side end and which has an M̄n of 572), "Placcel FM-1" (polycaprolactone containing methacryloyl group at the side end and which has an M̄n of 244) and "Placcel FM-4" (polycaprolactone containing methacryloyl group at the side end and which has an M̄n of 600); an unsaturated carboxylic acid such as acrylic acid, methacrylic acid, maleic acid, fumaric acid or itaconic acid or a salt (for instance, alkali metal salt, ammonium salt, amine salt, and the like) thereof, an unsaturated carboxylic anhydride such as maleic anhydride or a salt thereof; an other vinyl compound such as vinyl methyl ether, vinyl chloride, vinylidene chloride, chloroprene, propylene, butadiene, isoprene, maleimide, N-vinylimidazole or vinylsulfonic acid; and the like.

Examples of the hydrolyzable silyl group-containing monomers are, for instance.

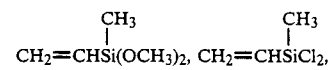

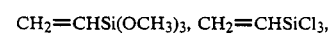

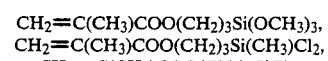

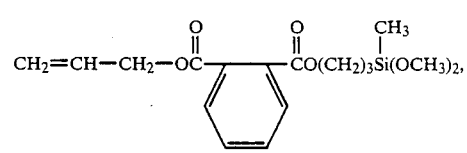

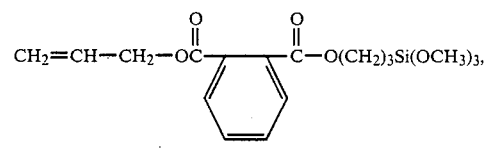

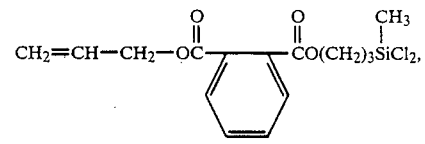

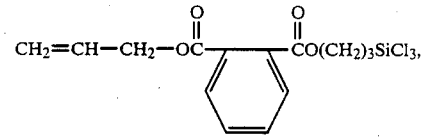

and the like.

The hydrolyzable silyl group-containing monomer can be copolymerized with the vinyl monomer in a manner, for instance, as described in Japanese Unexamined Patent Publications No. 36395/1979, No. 36109/1982, No. 157810/1983, and the like to give the polymer (A). Especially, the copolymerization of the hydrolyzable silyl group-containing monomer with the vinyl monomer is preferably carried out by means of solution polymerization using an azo radical polymerization initiator such as azobisisobutyronitrile.

If necessary, there may be used a chain transfer agent for controlling the molecular weight of the hydrolyzable silyl group-containing vinyl polymer (A). Examples of the chain transfer agents are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, (CH$_3$O)$_3$Si—S—S—S—(OCH$_3$)$_3$, (CH$_3$O)$_3$Si—S-$_8$—Si—(OCH$_3$)$_3$, and the like. Particularly, when using the chain transfer agent having hydrolyzable silyl group in its molecule, such as γ-mercaptopropyltrimethoxysilane, it is possible to introduce hydrolyzable silyl group into the silyl group-containing vinyl polymer (A) at the polymer end.

Non-reactive solvents are used in the above-mentioned copolymerization without particular limitations. Examples of the non-reactive solvents are, for instance, hydrocarbons such as toluene, xylene, n-hexane and cyclohexane, acetic esters such as ethyl acetate and butyl acetate, alcohols such as methanol, ethanol, isopropanol and n-butanol, ethers such as ethyl cellosolve, butyl cellosolve and cellosolve acetate, ketones such as methyl ethyl ketone, ethyl acetoacetate, acetylacetone, diacetone alcohol, methyl isobutyl ketone and acetone, and the like.

The silane compound (B) used in the present invention can be prepared as follows:

(a) A polyolefin compound (2) having allyl groups at the both polymer ends or one polymer end with a molecular weight of 100 to 3,000 is subjected to hydrosilylation with a hydrosilane compound having the formula (1):

(1)

wherein each R$^1$ is independently a monovalent hydrocarbon group having 1 to 10, preferably from 1 to 6, carbon atoms selected from an alkyl group, an aralkyl group and an aryl group, and when more than one R$^1$ are present, the groups R$^1$ are the same or different; each X is independently a halogen atom, a hydroxyl group, an alkoxyl group, an acyloxyl group, an aminoxy group, a phenoxy group, a thioalkoxyl group, an amino group, a ketoxymate group or an alkenyloxy group, and when more than one X are present, the groups X are the same or different; and n is 0, 1 or 2, to give the silane compound having the formula (B-1):

(B-1)

wherein R$^2$ is a bivalent hydrocarbon group having 8 to 200, preferably 8 to 90, carbon atoms selected from an alkylene group, an aralkylene group and an arylene group; and R$^1$, X and n are as defined above, or to give the silane compound having the formula (B-2):

(B-2)

wherein R$^3$ is a monovalent hydrocarbon group having 8 to 200, preferably 8 to 90, carbon atoms selected from an alkyl group, an aralkyl group and an aryl group; and R$^1$, X and n are as defined above.

(b) A polyolefin compound (3) having hydroxyl groups at the both polymer ends or one polymer end with a molecular weight of 100 to 3,000 is subjected to Williamson's synthesis of ether to give a polyolefin compound having allyl groups at the both polymer ends or one polymer end, and then, the obtained polyolefin compound is subjected to hydrosilylation with the above-mentioned hydrosilane compound (1) to give the silane compound having the formula (B-3):

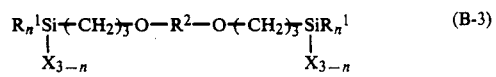
(B-3)

wherein R$^1$, R$^2$, X and n are as defined above, or to give the silane compound having the formula (B-4):

(B-4)

wherein R$^1$, R$^3$, X and n are as defined above.

(c) The polyolefin compound (3) having hydroxyl groups at the both polymers ends or the polymer end with a molecular weight of 100 to 3,000 is blocked with an isocyanatosilane (4) to give the silane compound having the formula (B-5):

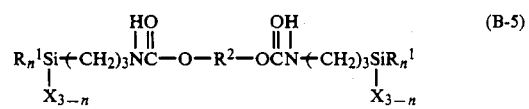
(B-5)

wherein R$^1$, R$^2$, X and n are as defined above, or to give the silane compound having the compound (B-6):

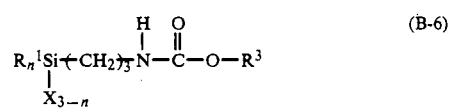
(B-6)

wherein R$^1$, R$^3$, X and n are as defined above.

The hydrosilylation reaction of the allyl group in the polyolefin compound with the hydrosilane compound (1) in the processes (a) and (b) is conducted with a transition metal complex compound (VIII), as a catalyst, selected from the group consisting of platinum, rhodium, cobalt, palladium and nickel at a temperature of 50° to 150° C. The reaction proceeds quantitatively over 1 to 4 hours.

When the hydroxyl group in the polyolefin compound is reacted with the isocyanatosilane in the process (c), a catalyst may be used or not. When it is necessary to advance the addition reaction of the hydroxyl group with the isocyanatosilane quickly, there can be used a compound, e.g. an organotin compound such as dibutyltin dilaurate or tin octoate, a tertiary amine compound such as dimethylbenzylamine or triethylamine. The reaction is carried out at a temperature of 50° to 150° C. The process of the reaction is traced by the absorption for NCO at 2270 cm$^{-1}$ in an infrared absorption spectrum.

Examples of the polyolefin compounds (2) having allyl groups at the both polymer ends or one polymer end are, for instance, 1-octene, 1-decene, 1-tetradecene, 1-hexadecene, 1-octadecene, 1,7-octadiene, 1,9-decadiene, 1,13-tetradecadiene, and the like.

Examples of the polyolefin compounds (3) having hydroxyl groups at the both polymer ends or one polymer end are, for instance, 1-octanol, 1-decanol, 1-tetradecanol, 1-hexadecanol, 1-octadecanol, 1,8-octanediol, 1,10-decanediol, 1,14-tetradecanediol, 1,16-hexadecanediol, 1,18-octadecanediol, "POLYTALE-HA <M-1000>" (polyolefin polyol commercially available from MITSUBISHI KASEI CORPORATION), "POLYTALE-HA" (polyolefin polyol) "NISSO-PB G-1000" (polybutadiene glycol commercially available from Nippon Soda Co., Ltd.), "NISSO-PB G-2000" (polybutadiene glycol), "NISSO-PB GI-1000" (hydrogenated polybutadiene glycol commercially available from Nippon Soda Co., Ltd.), "NISSO-PB GI-2000" (hydrogenated polybutadiene glycol), and the like.

Examples of the hydrosilane compounds (1) are, for instance, halogenated silane compounds such as trichlorosilane, methyldichlorosilane, dimethylchlorosilane and phenyldichlorosilane; alkoxysilane compounds such as trimethoxysilane, triethoxysilane, methyldimethoxysilane, methyldiethoxysilane and phenyldimethoxysilane; acyloxysilane compounds such as triacetoxysilane, methyldiacetoxysilane and phenyldiacetoxysilane; and other silane compounds such as dimethylethylmethylketoximesilane, triaminoxysilane, methyldiaminoxysilane and methyldiaminosilane; and the like.

Examples of the isosyanatosilanes (4) are, for instance, γ-isocyanatopropyltrimethoxysilane, γ-isocyanatopropyltriethoxysilane, γ-isocyanatopropylmethyldimethoxysilane, and the like.

In the present invention, the curing catalyst (C) may be used.

The curing catalyst (C) used in the invention includes, for instance, an organotin compound, a phosphoric acid or acid phosphate, an addition reaction product of a phosphoric acid or acid phosphate with an epoxy compound or an epoxy silane compound, a copolymer having phosphoric acid group or an acid phosphate group prepared by copolymerizing a compound having phosphoric acid group or an acid phosphate group and a polymerizable double bond with a vinyl monomer, the copolymer having a number average molecular weight of 1,000 to 30,000, amines, an alkali compound, an alkyl titanate, an organic aluminum, an acidic compound, and the like. The catalysts (C) are not limited thereto.

Among them, the typical catalysts are cited as follows:

(C-1) A phosphorus compound having the formula (5):

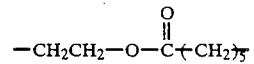
(5)

wherein $R^4$ is a monovalent hydrocarbon group having 1 to 20 carbon atoms selected from an alkyl group, an aryl group and an aralkyl group, and m is an integer of 1 to 3

(C-2) An addition reaction product of the phosphorus compound (C-1) having the formula (5) with an epoxy compound (C-3) A copolymer of an acrylate or methacrylate having a phosphoric acid or acid phosphate group represented by the formula (6):

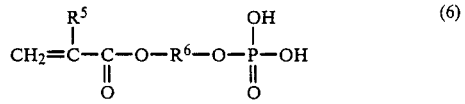
(6)

wherein $R^5$ is a hydrogen atom or a methyl group, and $R^6$ is a bivalent hydrocarbon group having 1 to 10, preferably from 2 to 10, carbon atoms selected from an alkylene group, an aralkylene group, an arylene group and a group having the formula:

$$-CH_2CH_2-O-\overset{O}{\underset{\|}{C}}(CH_2)_5-$$

or the formula (7):

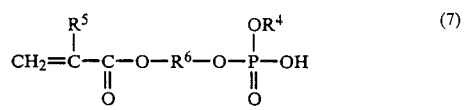
(7)

wherein $R^4$, $R^5$ and $R^6$ are as defined above, with a vinyl monomer, the copolymer having a number average molecular weight of 1,000 to 30,000

(C-4) An addition reaction product of the phosphorus compound (C-1) with an epoxy silane (C-5) An addition reaction product of the phosphorus compound (C-1) with γ-glycidoxypropyltrimethoxysilane Concrete examples of the organotin compounds are, for instance, dibutyl tin dilaurate, dibutyl tin dimaleate, dioctyl tin dilaurate, dioctyl tin dimaleate, tin octoate, and the like. Concrete examples of the phosphorus compound are, for instance, phosphoric acid or acid phosphate such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, and the like. As to the addition reaction product of phosphoric acid or monomeric acid phosphate with epoxy compound or epoxy silane compound, the concrete examples of the epoxy compounds are, for instance, propylene oxide, butylene oxide, cyclohexene oxide, glycidyl methacrylate, glycidol, allyl glycidyl ether, and the like, and the concrete examples of the epoxy silane compounds are, for instance, γ-glycidoxypropyltrimethoxysilane, γ-glycidoxypropyltriethoxysilane, γ-glycidoxypropylmethyldimethoxysilane,

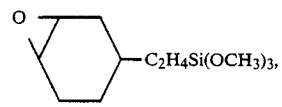

"Cardula E" (commercially available from Yuka Schell Kabushiki Kaisha), and "Epicote 828" (epoxy resin) (commercially available from Yuka Shell Kabushiki Kaisha) or "Epicote 1001", and the like. As to the copolymer having phosphoric acid group or acid phosphate group, which has the number average molecular weight of 1,000 to 30,000, of the compound having both phosphoric acid group or acid phosphate group and the polymerizable double bond in its molecule with the vinyl monomer, the concrete examples of the compounds having the phosphoric acid or acid phosphate group and the polymerizable double bond are, for instance, mono[β-hydroxyethylmethacrylate]acid phosphate, "KAYAMER PM-1" (commercially available from NIPPON KAYAKU CO., LTD.), "KAYAMER PM-2", "KAYAMER PM-21", a reaction product of glycidyl methacrylate with phosphoric acid, and the like, and the concrete examples of the vinyl monomers are, for instance, acrylic esters such as butyl acrylate, methacrylic esters such as methyl methacrylate and 2-hydroxyethyl methacrylate, acrylic acid, styrene, and the like. The concrete examples of the amines are, for instance, hexylamine, di-2-ethylhexylamine, N,N-dimethyldodecylamine, dodecylamine, and the like. The concrete examples of the alkali compounds are, for instance, sodium hydroxide, potassium hydroxide, and the like. Although the polymer composition of the invention can cure without using the curing catalyst (C), when using the catalyst (C), the curing of the composition can proceed quickly. The curing catalyst (C) may be used alone or as an admixture thereof.

In the curable composition of the invention, the amounts of the hydrolyzable silyl group-containing vinyl polymer (A), the silane compound (B) and the curing catalyst (C), that is, the mixing ratio of (A):(B):(C)=100: from 0.1 to 100: from 0 to 20 (weight ratio), preferably the mixing ratio of (A):(B):(C)=100: from 0.5 to 20: from 0.01 to 10 (weight ratio). When the amount of the silane compound (B) is less than 0.1 part by weight based on 100 parts by weight of the vinyl polymer (A), the adhesion to the melamine alkyd or melamine acrylic resin coating cannot be improved, and when the amount of the silane compound (B) is more than 100 parts by weight, the compatibility lowers and the obtained coating films become brittle.

The cause why the silane compound (B) having the long polyolefin chain can improve the adhesion could be considered that the silane compounds (B) having relatively small molecular weight can be introduced into the network structure of the silyl group-containing vinyl polymer (A).

The silane compound (B) has not only the effect for improving the adhesion to the melamine alkyd or melamine acrylic resin coatings but also the effect for improving the hardness, solvent resistance and staining resistance. Among the silane compounds (B) a silane compound (B) having two hydrolyzable silyl groups in its molecule is effective for improving, particularly, the hardness and solvent resistance. Also, a silane compound (B) having one hydrolyzable silyl group in its molecule is effective for improving, particularly, the staining resistance.

In the curable composition of the invention, a dehydrating agent may be used or not. The dehydrating agent can be used in order to obtain the stability of the curable composition of the invention, for instance, the stability of the composition can be maintained for a long time, or even if using the composition repeatedly, the stability can be maintained. Examples of the dehydrating agents are, for instance, hydrolyzable ester compounds such as methyl orthoformate, ethyl orthoformate, methyl orthoacetate, ethyl orthoacetate, methyltrimethoxysilane, Y-methacryloyloxypropyltrimethoxysilane, vinyltrimethoxysilane, methyl silicate and ethyl silicate, and the like. The dehydrating agents are added during the polymerization of the silyl group-containing vinyl polymer (A), or added to the polymerization system.

In the curable composition of the present invention, there can be added according to the uses thereof various additives such as pigments, ultraviolet absorbers, agents for preventing precipitation and leveling agents; celluloses such as nitrocellulose and cellulose acetate butyrate, resins such as alkyd resins, acrylic resins, vinyl chloride resins, chlorinated propylene resins, chlorinated rubbers and polyvinyl butyral, and the like.

The present invention is more specifically described and explained by means of the following Examples in which all % and part are by weight unless otherwise noted. It is to be understood that the present invention is not limited to the Examples and various changes and modifications may be made in the present invention without departing from the spirit and scope thereof.

REFERENCE EXAMPLE 1

[Preparation of the silyl group-containing vinyl polymer (A)]

A reactor equipped with a stirrer, a thermometer, a nitrogen inlet tube, a dropping funnel and a condenser was charged with 340 g of xylene and heated to 110° C. To the reactor was continuously added dropwise under reflux over 3 hours a mixture of 140 g of styrene, 166 g of butyl acrylate, 467 g of methyl methacrylate, 100 g of stearyl methacrylate, 117 g of γ-methacryloyloxypropyltrimethoxysilane, 10 g of N-methylolacrylamide, 30 g of γ-mercaptopropyltrimethoxysilane and 30 g of azobisisobutyronitrile. A solution of 3 g of azobisisobutyronitrile in 200 g of toluene was further added dropwise to the reactor over 1 hour, and the polymerization reaction was continued for 1 hour to give a silyl group-containing vinyl polymer (A). The concentration of the non-volatile matter in the obtained reaction mixture in the form of a solution was 65%. The thus prepared silyl group-containing vinyl polymer (A) had a number average molecular weight of 4,400 measured by gel permeation chromatography (GPC).

REFERENCE EXAMPLE 2

[Preparation of the reaction product of the epoxy compound with the acid phosphate]

A reactor equipped with a stirrer, a thermometer, a nitrogen inlet tube, a dropping funnel and a condenser was charged with 50 g of "MP-4" (monobutyl phosphate having an acid value of 670, commercially available from DAIHACHI CHEMICAL Co., Ltd.), and 70.5 g of γ-glycidoxypropyltrimethoxysilane was gradually added dropwise thereto at 20° C. over 1 hour with stirring in a nitrogen atmosphere. The reaction system was heated at 80° C. for 1 hour from the time when the exothermic reaction was stopped. After cooling the reaction mixture, 12 g of methyl orthoacetate, 12 g of methanol and 96.5 g of xylene were added thereto to give a curing catalyst solution [hereinafter referred to as "curing catalyst (1)"]. The curing catalyst (1) had a concentration of the effective component of 50%.

REFERENCE EXAMPLE 3

Preparation of the copolymer having acid phosphate group]

A reactor equipped with a stirrer, a thermometer, a nitrogen inlet tube, a dropping funnel and a condenser was charged with 170 g of isopropanol and 170 g of butyl acetate, and the mixture was heated to 110° C. To the reactor was continuously added dropwise under reflux over 3 hours a mixture of 200 g of styrene, 300 g of butyl acrylate, 380 g of methyl methacrylate, 100 g of "MR-200" (2-methacryloyloxyethyl acid phosphate commercially available from DAIHACHI CHEMICAL Co., Ltd.), 20 g of acrylic acid and 30 g of azobisisobutyronitrile. A solution of 3 g of azobisisobutyronitrile in 200 g of butyl acetate was further added dropwise to the reactor over 1 hour and the reaction was continued for 1 hour. To the reaction mixture was added 350 g of isopropanol to give a curing catalyst solution of the copolymer having acid phosphate group [hereinafter referred to as "curing catalyst (2)"]. The curing catalyst (2) had a solid content of 50%.

REFERENCE EXAMPLE 4

[Preparation of the silane compound (B-1)]

A pressure vessel was charged with 138 g of 1,9-decadiene, to which 256 g of trimethoxysilane and 10% isopropanol solution of 1.04 g of chloroplatinic acid were added in a nitrogen atmosphere, and the mixture was reacted at 90° C. for 4 hours. In an infrared absorption spectrum of the reaction mixture it was observed that the absorption for allyl group at 1640 cm$^{-1}$ disappeared.

Then, unreacted trimethoxysilane was distilled away at 100° C. under reduced pressure (5 mmHg) from the reaction mixture to give a silane compound (B-1) having the structure: $(CH_3)_3Si-(CH_2)_{10}Si-(OCH_3)_3$.

REFERENCE EXAMPLE 5

[Preparation of the silane compound (B-2)]

A pressure vessel was charged with 252 g of 1-octadecene, to which 142 g of trichlorosilane and 10% isopropanol solution of 0.5 g of chloroplatinic acid were added in a nitrogen atmosphere, and the mixture was reacted at 90° C. for 4 hours. In an infrared absorption spectrum of the reaction mixture it was observed the absorption for allyl group at 1640 cm$^{-1}$ disappeared.

Then, unreacted trichlorosilane was distilled away from the reaction mixture at 100° C. under reduced pressure (5 mmHg). To the resultant was added 192 g of methanol, hydrogen chloride gas generated was removed under reduced pressure, and 100 g of methyl orthoformate was added thereto. Ester interchange reaction was carried out at 60° C. for 2 hours, then the volatile matter was distilled away from the reaction mixture under reduced pressure (5 mmHg) to give the silane compound
(B-2) having the structure: $(CH_3O)_3Si-CH_2)_{17}CH_3$.

REFERENCE EXAMPLE 6

[Preparation of the silane compound (B-6)]

A pressure vessel was charged with 270 g of 1-octadecanol, and thereto 14 g of hexane was added. Degasification was conducted under reduced pressure (5 mmHg) at 90° C. for 1 hour, and water is removed from the reaction mixture.

To the mixture was added 257 g of γ-isocyanatopropyltriethoxysilane under nitrogen stream, and the reaction was continued at 90° C. for 2 hours and then at 110° C. for 1 hour. In an infrared absorption spectrum of the reaction mixture it was observed that the absorption for isocyanate group at 2270 cm$^{-1}$ disappeared and the absorption for urethane bond at 1530 cm$^{-1}$ appeared. The thus obtained silane compound (B-6) had the following structure:

REFERENCE EXAMPLE 7

[Preparation of the silane compound (B-3)]

A pressure vessel was charged with 500 g of "NISSO-PB GI-1000" (hydrogenated polybutadiene glycol having a hydroxyl value of 63.6 commercially available from Nippon Soda Co., Ltd.). To the vessel was added 25 g of hexane, degasification was conducted at 90° C. for 1 hour under reduced pressure (5 mmHg), and water was removed from the reaction mixture. To the system was added 28% methanol solution of 126 g of sodium methoxide, and the reaction was carried out at 140° C. for 4 hours under reduced pressure with distilling away methanol from the mixture. The reaction was continued further at 110° C. for 2 hours with adding dropwise 52.5 g of allyl chloride thereto. Then, the volatile matter was distilled away from the reaction mixture at 110° C. under reduced pressure. After cooling, 1.5 l of hexane and 50 g of aluminum silicate were added to the reaction product, and the mixture was stirred for 1 hour. After the mixture was allowed to stand, the mixture was filtered off through Celite to remove salts. Then, hexane was removed from the resultant under reduced pressure to give a hydrogenated polybutadiene having allyl groups at both polymer ends.

A pressure vessel was charged with 300 g of the obtained hydrogenated polybutadiene and 15 g of hexane was added thereto. Degasification was conducted at 90° C. under reduced pressure and water was removed from the reaction mixture. To the mixture were added 49.9 g of trimethoxysilane and 10% isopropanol solution of 0.21 g of chloroplatinic acid, and the mixture was reacted at 90° C. for 4 hours.

After the reaction was completed, the volatile matter was distilled away from the reaction mixture at 100° C. under reduced pressure to give a hydrogenated polybutadiene having trimethoxysilyl groups at the both polymer ends (silane compound (B-3)).

EXAMPLES 1 TO 7 AND COMPARATIVE EXAMPLES 1 TO 4

There were admixed the silyl group-containing vinyl polymer (A) obtained in Reference Example 1, the silane compound (B) having the long polyolefin chain obtained in each Reference Example 4 to 7 (in Comparative Examples 1 to 4, the silane compound (B) was not used), and the curing catalyst (C) obtained in each Reference Example 2 and 3, "TN 801" (dioctyl tin maleate commercially available from SAKAI CHEMICAL Co., Ltd.) or "AP-8" (a mixture of dioctyl phosphate and monooctyl phosphate commercially available from DAIHACHI CHEMICAL Co., Ltd.) in amounts shown in Table 1 to give a curable composition.

The obtained composition was diluted with xylene to give a coating composition having a viscosity preferable for coating.

A polished mild steel plate was sanded with a No. 240 water-proof abrasive paper, on which a two component urethane surfacer (commercially available under the trade name "Hi-PRASURF 2C" made by Isamu Toryo Kabushiki Kaisha) was coated. After drying, the surface of the surfacer film was sanded with a No. 400 water-proof abrasive paper, on which a clear coating of a melamine acrylic resin (commercially available under the trade name "MAGICRON M-77" made by KANSAI PAINT CO., LTD.) was coated, and the plate was baked at 150° C. for 30 minutes. The obtained melamine acrylic resin film was buffed with semi-fine compound to give a substrate.

Each coating composition obtained in Examples 1 to 7 and Comparative Examples 1 to 4 was sprayed onto the melamine acrylic resin film in a usual manner, the plate was dried at 60° C. for 30 minutes and allowed it to stand at room temperature for 7 days to give a cured film on the substrate (test piece).

[Adhesion]

(1) First adhesion

The film of the obtained test piece is cut off with a knife to a square having sizes of 2 mm × 2 mm, and the procedure of adhesion-peeling off with a a cellophane adhesive tape is conducted. The film state of the test piece is observed with the naked eye.

(2) Second adhesion

The tested test piece is allowed to stand in a blister box (temperature: 50° C., RH: 98%) for three days, and the procedure of adhesion-peeling off was conducted in the same manner as above.

The first and second adhesions are estimated according to criteria prescribed by Japan Paint Inspecting Association. That is, in Table 1, a case that peeling-off does not occur is shown as 10 and a case that peeling-off occurs wholly is shown as 0.

(C) 0 to 20 parts by weight of a curing catalyst, said silane compound (B) being silane compound selected from the group consisting of a compound having the formula (B-1);

wherein each $R^1$ is independently a monovalent hydrocarbon group having 1 to 10 carbon atoms selected from the group consisting of alkyl, aralkyl and aryl, and when more than one $R^1$ are present, the groups $R^1$ are the same or different; $R^2$ is a bivalent hydrocarbon group having 8 to 200 carbon atoms selected from the group consisting of alkylene, aralkylene and arylene; each X is independently a halogen atom, a hydroxyl group, an alkoxyl group, an acyloxyl group, an aminoxy group, a phenoxy group, a thioalkoxyl group, an amino group, a ketoxymate group or an alkenyloxy group, and when more than one X are present, the groups X are the same or different; and n is 0, or 1, a compound having the formula (B-2):

wherein $R^3$ is a monovalent hydrocarbon group

TABLE 1

|  | Amount of the vinyl polymer (A) (part) | Silane compound (B) Kind | Amount (part) | Curing catalyst (C) Kind | Amount (part) | Adhesion First adhesion | Second adhesion |
| --- | --- | --- | --- | --- | --- | --- | --- |
| Ex. 1 | 100 | Compound (B-1) | 6.5 | Curing catalyst (1) | 2 | 10 | 9 |
| Ex. 2 | 100 | Compound (B-2) | 6.5 | Curing catalyst (1) | 2 | 10 | 9 |
| Ex. 3 | 100 | Compound (B-6) | 6.5 | Curing catalyst (1) | 2 | 10 | 9 |
| Ex. 4 | 100 | Compound (B-3) | 6.5 | Curing catalyst (1) | 2 | 10 | 9 |
| Ex. 5 | 100 | Compound (B-2) | 6.5 | AP-8*[1] | 1 | 9 | 8 |
| Ex. 6 | 100 | Compound (B-2) | 6.5 | Curing catalyst (2) | 10 | 8 | 7 |
| Ex. 7 | 100 | Compound (B-2) | 6.5 | TN 801*[2] | 2 | 8 | 7 |
| Com. Ex. 1 | 100 | — | — | AP-8 | 1 | 1 | 0 |
| Com. Ex. 2 | 100 | — | — | Curing catalyst (1) | 2 | 2 | 0 |
| Com. Ex. 3 | 100 | — | — | Curing catalyst (2) | 10 | 0 | 0 |
| Com. Ex. 4 | 100 | — | — | TN 801 | 2 | 0 | 0 |

(Notes)
*[1]A mixture of dioctylphosphate and monooctyl phosphate made by DAIHACHI CHEMICAL Co., Ltd.
*[2]Dioctyltin maleate 2-ethylhexyl ester made by SAKAI CHEMICAL Co., Ltd.

In addition to the ingredients used in the Examples, other ingredients can be used in the Examples as set forth in the specification to obtain substantially the same results.

What we claim is:

1. A curable composition at room temperature comprising
   (A) 100 parts by weight of acrylic polymer having on the polymer chain end or the side chain thereof at least one silicon atom to which a hydrolyzable group is linked, per one molecule, the main chain of the acrylic polymer consisting essentially of acrylic monomer units,
   (B) 0.1 to 100 parts by weight of a silane compound and having 8 to 200 carbon atoms selected from the group consisting of alkyl, aralkyl and aryl group; and $R^1$, X and n are as defined above, a compound having the formula (B-3):

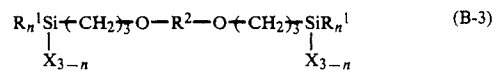

wherein $R^1$, $R^2$, X and n are as defined above, a compound having the formula (B-4):

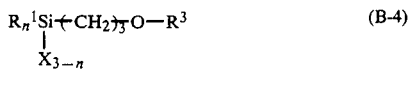 (B-4)

wherein $R^1$, $R^3$, X and n are as defined above, a compound having the formula (B-5):

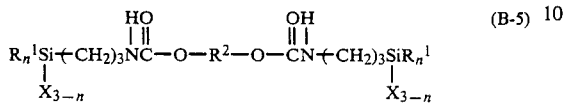 (B-5)

wherein $R^1$, $R^2$, X and n are as defined above, and a compound having the compound (B-6):

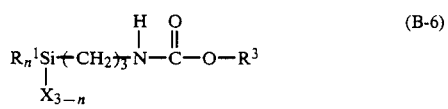 (B-6)

wherein $R^1$, $R^3$, X and n are as defined above.

2. The composition of claim 1, wherein the amount of said silane compound (B) is from 0.5 to 20 parts by weight based on 100 parts by weight of said vinyl polymer (A).

3. The composition of claim 1, wherein the amount of said curing catalyst (C) is from 0.01 to 10 parts by weight based on 100 parts by weight of the vinyl polymer (A).

4. The composition of claim 1, wherein said curing catalyst (C) is a phosphorous compound having the formula (5):

 (5)

wherein $R^4$ is a monovalent hydrocarbon group having 1 to 20 carbon atoms selected from an alkyl group, an aryl group and an aralkyl group and m is an integer of 1 to 3.

5. The composition of claim 1, wherein said curing catalyst (C) is an addition reaction product of a phosphorous compound having the formula (5):

 (5)

wherein $R^4$ is a monovalent hydrocarbon group having 1 to 20 carbon atoms selected from the group consisting of alkyl, aryl and aralkyl and m is an integer of 1 to 3 with an epoxy compound.

6. The composition of claim 1, wherein said curing catalyst (C) is a copolymer of a compound represented by the formula (6):

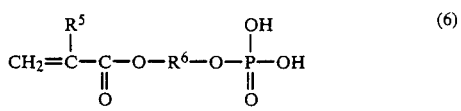 (6)

wherein $R^5$ is a hydrogen atom or a methyl group, and $R^6$ is a bivalent hydrocarbon group having 1 to 10 carbon atoms selected from the group consisting of alkylene, aralkylene, arylene and a group:

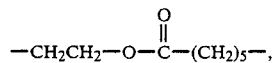

with a vinyl monomer; said copolymer having a number average molecular weight of 1,000 to 30,000.

7. The composition of claim 1, wherein said curing catalyst (C) is a copolymer of a compound represented by the formula (7):

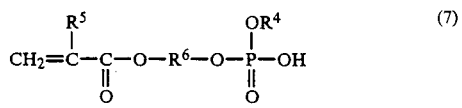 (7)

wherein $R^4$ is a monovalent hydrocarbon group having 1 to 20 carbon atoms selected from an alkyl group, an aryl group and an aralkyl group, $R^5$ is a hydrogen atom or a methyl group, and $R^6$ is a bivalent hydrocarbon group having 1 to 10 carbon atoms selected from the group consisting of alkylene, aralkylene, arylene and a group:

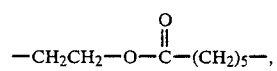

with a vinyl monomer; said copolymer having a number average molecular weight of 1,000 to 30,000.

8. The composition of claim 1, wherein said curing catalyst (C) is an addition reaction product of a phosphorus compound having the formula (5):

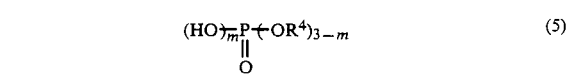 (5)

wherein $R^4$ is a monovalent hydrocarbon group having 1 to 20 carbon atoms selected from the group consisting of alkyl, aryl and aralkyl and m is an integer of 1 to 3 with an epoxysilane.

9. The composition of claim 1, wherein said curing catalyst (C) is an addition reaction product of a phosphorous compound having the formula (5):

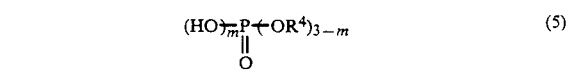 (5)

wherein $R^4$ is a monovalent hydrocarbon group having 1 to 20 carbon atoms selected from the group consisting of alkyl, aryl and aralkyl and m is an integer of 1 to 3 with $\tau$-glycidoxypropyltrimethoxysilane.

* * * * *